United States Patent
Jung et al.

(10) Patent No.: US 9,137,769 B2
(45) Date of Patent: Sep. 15, 2015

(54) DATA TRANSMISSION METHOD IN M2M DEVICE GROUP

(75) Inventors: In Uk Jung, Anyang-si (KR); Wook Bong Lee, Anyang-si (KR); Jin Sam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 14/240,307

(22) PCT Filed: Apr. 18, 2012

(86) PCT No.: PCT/KR2012/002938
§ 371 (c)(1),
(2), (4) Date: Feb. 21, 2014

(87) PCT Pub. No.: WO2013/035959
PCT Pub. Date: Mar. 14, 2013

(65) Prior Publication Data
US 2014/0213252 A1    Jul. 31, 2014

Related U.S. Application Data

(60) Provisional application No. 61/531,625, filed on Sep. 7, 2011.

(51) Int. Cl.
*H04W 8/26* (2009.01)
*H04W 8/04* (2009.01)
*H04W 60/04* (2009.01)
(Continued)

(52) U.S. Cl.
CPC ............. *H04W 60/00* (2013.01); *H04W 4/005* (2013.01); *H04W 4/08* (2013.01); *H04W 8/186* (2013.01); *H04W 76/02* (2013.01)

(58) Field of Classification Search
CPC ......... H04W 8/26; H04W 8/04; H04W 60/00; H04W 12/06; H04W 48/16; H04W 36/14; H04W 64/00
USPC ........................................ 455/435.1
See application file for complete search history.

(56) References Cited

U.S. PATENT DOCUMENTS

2007/0032255 A1\*   2/2007   Koo et al. ............. 455/512
2010/0041399 A1\*   2/2010   Kim et al. ............. 455/434
(Continued)

OTHER PUBLICATIONS

Zhou, et al., "Proposed Text for network access entry for a large number of M2M devices," IEEE 802.16 Broadband Wireless Access Working Group, IEEE C802.16p-11/0131, Jul. 2011, 11 pages.
(Continued)

*Primary Examiner* — Kashif Siddiqui
*Assistant Examiner* — Obidon Bassinan
(74) *Attorney, Agent, or Firm* — Lee, Hong, Degerman, Kang & Waimey (57) ABSTRACT

The present disclosure relates to a method for M2M devices in an idle mode to perform a network reentry procedure in a wireless access network supporting machine-to-machine communication (M2M), and the method may include receiving information related to selection of a group delegate (GD) from a base station; receiving a response to a ranging request from the base station, wherein the ranging request is transmitted by an M2M device which is selected as the GD among a plurality of M2M devices in an M2M device group based on the information related to selection of the GD; and performing a network reentry procedure on the basis of the received response.

17 Claims, 5 Drawing Sheets

(51) Int. Cl.

| | | |
|---|---|---|
| *H04W 60/00* | (2009.01) | |
| *H04W 12/06* | (2009.01) | |
| *H04W 8/18* | (2009.01) | |
| *H04W 4/00* | (2009.01) | |
| *H04W 4/08* | (2009.01) | |
| *H04W 76/02* | (2009.01) | |

(56) References Cited

U.S. PATENT DOCUMENTS

| | | | |
|---|---|---|---|
| 2011/0159906 A1* | 6/2011 | Baek et al. | 455/509 |
| 2012/0142268 A1* | 6/2012 | Tao et al. | 455/3.05 |
| 2013/0064213 A1* | 3/2013 | Park et al. | 370/329 |

OTHER PUBLICATIONS

Huang, et al., "M2M group delegate assignment," IEEE 802.16 Broadband Wireless Access Working Group, IEEE C802.16p-11/0330, Oct. 2011, 5 pages.

Japan Patent Office Application Serial No. 2014-527048, Office Action dated Jan. 29, 2015, 3 pages.

Japan Patent Office Application Serial No. 2014-527048, Office Action dated Apr. 24, 2015, 3 pages.

Park, et al., "Proposed text for network reentry procedure of fixed M2M device," IEEE 802.16 Broadband Wireless Access Working Group, IEEE C802.16p-11/0018, Mar. 2011, 7 pages.

Jung, et al., "Group paging for M2M group," IEEE 802.16 Broadband Wireless Access Working Group, IEEE C802.16p-11/0080r1, May 2011, 5 pages.

Li, et al., "Optimized schemes of network re-entry for M2M in 16m," IEEE 802.16 Broadband Wireless Access Working Group, IEEE C802.16p-11_0092r6, May 2011, 9 pages.

Huang, et al., "M2M group control signaling scheme in 802.16m," IEEE 802.16 Broadband Wireless Access Working Group, IEEE C802.16p-11/0156, Jul. 2011, 4 pages.

* cited by examiner

DATA TRANSMISSION METHOD IN M2M DEVICE GROUP

CROSS-REFERENCE TO RELATED APPLICATIONS

This application is the National Stage filing under 35 U.S.C. 371 of International Application No. PCT/KR2012/002938, filed on Apr. 18, 2012, which claims the benefit of U.S. Provisional Application Ser. No. 61/531,625, filed on Sep. 7, 2011, the contents of which are hereby incorporated by reference herein in their entirety.

TECHNICAL FIELD

The present disclosure relates to an M2M device and an idle mode operation method thereof, and more particularly, to a network reentry method using an M2M group delegate (GD) and a device thereof.

BACKGROUND ART

M2M Communication (Machine Type Communication; MTC)

Hereinafter, machine-to-machine (M2M) communication (or machine type communication (MTC)) will be described in brief.

Machine-to-machine (M2M) communication may denote communication between an electronic device and an electronic device as its expression. In other words, M2M communication may denote communication between objects. In general, M2M communication may denote wired or wireless communication between electronic devices or communication between a human-controlled device and a machine, but it may be also used as a meaning of particularly referring to wireless communication between an electronic device and an electronic device, namely, between machines. M2M terminals used in a cellular network may have lower performance or capability than that of typical terminals.

A lot of terminal may exist within a cell, and those terminals may be distinguished from one another based on its type, class, service, and the like.

For example, based on their operation type, terminals may be largely classified into a human type communication (HTC) terminal and a machine type communication (MTC) terminal. The machine type communication (MTC) may include communication between M2M terminals. Here, human type communication (HTC) may denote the transmission and reception of signals for which the transmission of signals is determined by a human, whereas MTC may denote the transmission of signals triggered by itself or event occurrence in each terminal or periodically without the intervention of a human.

Furthermore, if machine-to-machine (M2M) communication (or machine type communication (MTC)) is taken into consideration, then the number of whole terminals may suddenly increase. M2M terminal may have the following features based on support services.

1. A lot of terminal within a cell
2. Low amount of data
3. Transmission of low frequency (may have periodicity)
4. Limited number of data characteristics
5. Insensitive to time delay
6. Having low mobility or fixed Furthermore, M2M communication may be used in various fields, such as protected access and surveillance, pursuit and discovery, public safety (emergency situation, disaster), payment (vending machine, ticket machine, parking meter), health care, remote control, smart meter, and the like.

Idle Mode

Idle mode is a mechanism capable of periodically receiving a downlink broadcast message without registering with a specific base station even when a terminal wanders in a wireless link environment having a plurality of base stations over a wide region.

Idle mode is a state in which only downlink synchronization is carried out to suspend all normal operations as well as handover (HO), and receive a paging message which is a broadcast message only for a predetermined interval. Paging message is a message for indicating paging action to a terminal. For example, the paging action may include ranging operation, network reentry, and the like.

Idle mode may be initiated by a terminal or initiated by a base station. In other words, the terminal may transmit a deregistration request (DREG-REQ) message to the base station, and receive a deregistration response (DREG-RSP) message in response to the deregistration request (DREG-REQ) message, thereby entering an idle mode. Furthermore, the base station may transmit a deregistration request (DREG-REQ) message or deregistration command (DREG-CMD) to the terminal, thereby entering an idle mode.

When a terminal receives a paging message corresponding to the terminal itself during an available interval (AI) in an idle mode, the terminal is switched to a connected mode through a network entry process with the base station to transmit and receive data.

Ranging

A user terminal performs a ranging process with the base station when accessing a network. The ranging process is a process for controlling a "time offset", a "frequency offset", and the like between the user terminal and base station and exchanging information such as management information. The user terminal may access the relevant network through such a ranging process, and performs a ranging process even when moving into a target base station through a handover procedure.

Furthermore, when the communication system is transited from an idle mode presented as a power reduction scheme of the user terminal to a normal operation mode, a network access should be attempted by selecting the best base station at a transition time point for the operation in the normal operation mode, and even at this time the ranging process is carried out. In this manner, the ranging process is carried out for various purposes.

The procedure of the ranging process may be typically classified into a code ranging and a RNG-REQ message ranging, and only the code ranging may be independently carried out, and the code ranging and RNG-REQ message ranging may be sequentially combined and carried out.

In describing the code ranging, it may be carried out using a process in which the user terminal transmits a specific CDMA code and the base station that has sensed the CDMA code responds using a RNG-RSP message. The base station determines whether or not it is required to control the "time offset", "frequency offset", and power of the relevant user terminal for a CDMA code index sensed by the base station itself, and the result is sent through a RNG-RSP message. The user terminal determines whether or not the code ranging attempted by the user terminal itself through receiving such a RNG-RSP message is successful, and then performs the required offset control.

The CDMA code is distinguished by a CDMA code index, and the user terminal should use a specific range of CDMA codes based on the purpose of the ranging operation. The base station grasps the purpose of the ranging process of the relevant user terminal based on a CDMA code index transmitted by the user terminal, and then performs a support corresponding to each purpose.

An uplink channel descriptor (UCD) message transmitted by the base station may include a parameter indicating a range of CDMA code indices supported by the relevant base station. The IEEE 802.16e standard may include the following information in the UCD message. The UCD message uses an uplink interval usage code (UIUC) used when the base station notifies the uplink region of each user terminal through UP-MAP. Each user terminal may know a modulation scheme/channel encoding scheme that should be applied to an uplink region assigned to the user terminal itself through the UIUC information. The UCD message may include information mapped with the UIUC value and modulation scheme/channel encoding scheme. Furthermore, the UCD information may include a range of CDMA codes that should be used for an operation such as "initial ranging", "periodic ranging", "bandwidth request", "handover", and the like.

DISCLOSURE OF THE INVENTION

The present disclosure proposes a method of allowing M2M terminals that belong to an M2M group to perform a ranging process for each M2M group. Furthermore, the present disclosure proposes a process of selecting a delegate of each M2M group for the foregoing method.

According to an aspect of the present invention, there is provided a method for M2M devices in an idle mode to perform a network reentry procedure in a wireless access network supporting machine-to-machine communication (M2M), and the method may include receiving information related to selection of a group delegate (GD) from a base station; receiving a response to a ranging request from the base station, wherein the ranging request is transmitted by an M2M device which is selected as the GD among a plurality of M2M devices in an M2M device group based on the information related to selection of the GD; and performing a network reentry procedure on the basis of the received response.

The M2M device which is selected as the GD among the plurality of M2M devices in the M2M device group may be selected as the GD by the base station on the basis of a status value of each of the M2M devices, wherein the status value of each of the M2M devices corresponds to the information related to the selection of the GD, and is transmitted by each of the M2M devices; and the M2M may receive ranging information for the M2M device group.

The receiving information related to the selection of the group delegate (GD) may be receiving information related the selection of the group delegate (GD) through an AAI-SCD message.

The information related to the selection of the group delegate (GD) may include at least one of a GD selection criterion, a priority of the selection criterion, and a threshold value of the each selection criterion, wherein the selection criterion may include at least one of a type of power supply, a remaining amount of battery, a link quality, and a location of the terminal.

The status value of each of the M2M devices may be transmitted through an AAI-RNG-REQ message, an AAI-SBC-REQ message or an AAI-REG-REQ message.

The M2M device, which is selected as the GD among the plurality of M2M devices in the M2M device group, may receive the ranging information for the M2M device group through an AAI-RNG-RSP message, an AAI-SBC-RSP message or an AAI-REG-RSP message.

The M2M device which is selected as the GD among the plurality of M2M devices in the M2M device group may be an M2M device that determines to perform a GD function on the basis of the received information related to the selection of the GD; and the M2M device may transmit the determined result value to the base station, and may receive ranging information for the M2M device group.

The ranging request transmitted by the M2M device which is selected as the GD may be a ranging code assigned by the base station.

The response to the ranging request may be transmitted through an AAI-RNG-ACK message.

The response to the ranging request may include one ranging state of success, abort, and continue.

The method may further include starting a timer upon a detection of an event of specific for the M2M device group; and wherein the network reentry procedure may be performed on the basis of the response in case of receiving the response to the ranging request before the timer expires.

According to another aspect of the present invention, there is provided a device in a wireless access network supporting machine-to-machine communication (M2M), the device may include a transceiver configured to transmit and/or receive a radio signal to and/or from the outside; and a controller connected to the transceiver, wherein the controller may control the transceiver to receive information related to selection of a group delegate (GD) from a base station, to receive a response to a ranging request from base station, wherein the ranging request is transmitted by an M2M device which is selected as the GD among a plurality of M2M devices in an M2M device group based on the information related to selection of the GD, and to perform a network reentry procedure on the basis of the received response to the ranging request.

The controller may be configured to control the transceiver to transmit a status value of the device corresponding to the received information related to the selection of the group delegate (GD) to the base station.

The information related to the selection of the group delegate (GD) may be transmitted through an AAI-SCD message.

The controller may be configured to determine whether to perform a GD function on the basis of the received information, and to control the transceiver to transmit the determined result value to the base station.

The ranging request transmitted by the M2M device which is selected as the GD may be a ranging code assigned by the base station.

The response to the ranging request may be transmitted through an AAI-RNG-ACK message.

According to an embodiment of the present disclosure, there is an effect of reducing network congestion caused by a network access of a plurality of M2M terminals.

Furthermore, through an embodiment of the present disclosure, an effective network resource management can be carried out.

MODES FOR CARRYING OUT THE PREFERRED EMBODIMENTS

The technology below will be used for various mobile communication systems such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), or the like. CDMA can be implemented using a radio technology such as UTRA (Universal Terrestrial Radio Access) or CDMA2000. TDMA can be implemented using a radio technology such as GSM (Global System for Mobile communication)/GPRS (General Packet Radio Service)/EDGE (Enhanced Data Rates for GSM Evolution). OFDMA can be implemented using a radio technology such as IEEE 802.11 (Wi-Fi), IEEE 802.16 (WiMAX), IEEE 802.20, E-UTRA (Evolved UTRA), or the like. IEEE 802.16m is an evolution of IEEE 802.16e, and provides backward compatibility to an IEEE 802.16e-based system.

Furthermore, IEEE 802.16p provides communication standard for supporting machine type communication (MTC).

UTRA is part of UMTS (Universal Mobile Telecommunication System). 3GPP (3rd Generation Partnership Project) LTE (Long Term Evolution), as part of E-UMTS (Evolved UMTS) that uses Evolved-UMTS Terrestrial Radio Access (E-UTRA), employs OFDMA in the downlink and employs SC-FDMA in the uplink. LTE-A (LTE-Advanced) is an evolution of 3GPP LTE.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Figure 1:
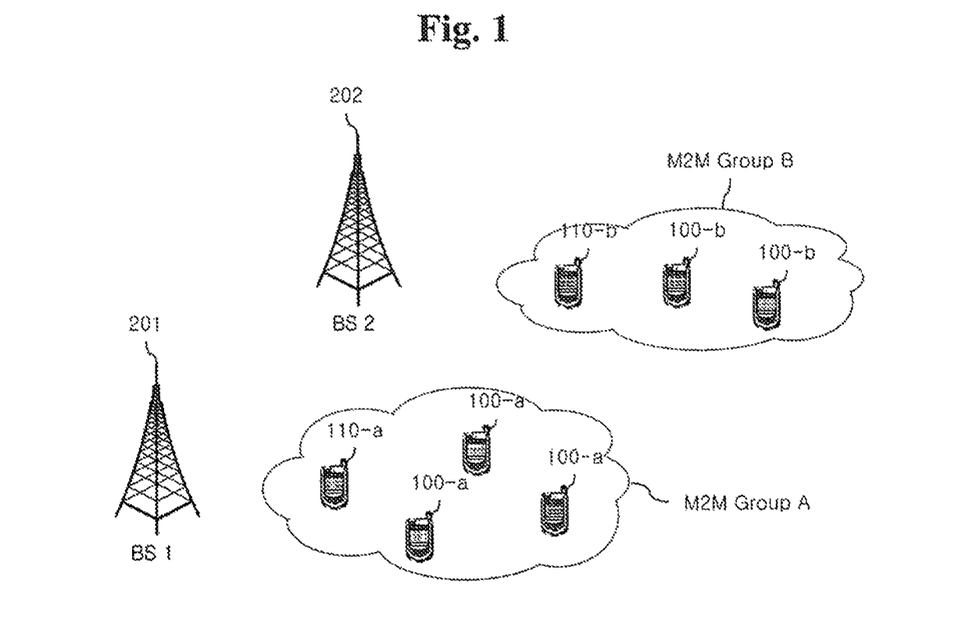
FIG. 1 is a conceptual view illustrating a wireless access network to which an embodiment of the present disclosure is applicable.

FIG. 1 is a conceptual view illustrating a wireless access network to which an embodiment of the present disclosure is applicable.

Referring to FIG. 1, a wireless communication network may include terminals 100, 110 and base stations 201, 202. The terminals 100, 110 may be fixed or have mobility, and may be also referred to as another term, such as user equipment (UE), user terminal (UT), subscriber station (SS), wireless device, advanced mobile station (AMS), and the like. Furthermore, the terminals 100, 110 may include the concept of an MTC or M2M terminal.

The base stations 201, 202 typically refer to a fixed station for performing communication with the terminals 101, 110, and may be also referred to as another term, such as NodeB, BTS (base transceiver system), access point, and the like. One or more cells may exist in one base station 201 or 202.

Hereinafter, embodiments of the present disclosure will be described around the IEEE 802.16 standard for clarity, but technical concept of the present invention disclosed herein will not be limited to this.

An M2M terminal (or an M2M device) according to an embodiment of the present disclosure may belong to one or more M2M groups. The M2M group is a group of M2M terminals that share one or more features in common. For example, the M2M group may be a set of terminals receiving a specific application service. Each M2M group is assigned with an M2M group identifier (MGID), wherein the MGID uniquely identifies a specific M2M group in a network entity. Here, the network entity may be an M2M server, for example.

The M2M group identifier (MGID) is assigned by a network entity, and may be assigned to a service flow of the M2M terminal through a DSA process subsequent to initially entering a network. Otherwise, it may be assigned through another process. The assigned MGID is retained by the M2M terminal unless the terminal exit from the network or the network deletes the service flow associated with the MGID. The MGID may be changed through a dynamic service change (DSC) procedure.

A plurality of M2M terminals may exist in one cell, and accordingly congestion may be caused by allowing a plurality of M2M terminals to attempt network access. In order to alleviate such congestion, there is proposed a method of initiating a network reentry for a group of M2M terminals.

M2M terminals 100, 110 illustrated in FIG. 1 may be classified into a group member (GM) and a group delegate (GD).

The GMs 100-a, 100-b are M2M terminals that belong to a M2M group. The GD 110-a, 110-b is an M2M terminal allowed to operate as a delegate of the M2M group, which can initiate ranging for an M2M group. Furthermore, the GD may monitor the traffic signals of the terminals in the relevant group to perform a signal quality report or alleviate interference with another group. Furthermore, the GD may relay downlink (DL) multicast data to group members to reduce decoding power.

The base station may assign information (for instance, dedicated ranging code, time offset, etc.) to be used for the ranging for an M2M group to the terminal 110-a, 110b selected as GD. When there is data to be reported by the M2M group, GD transmits a ranging request (for instance, ranging code). At this time, the ranging code transmitted by GD may be a ranging code selected from a ranging code set based on the MGID.

The base station transmits a response to the ranging request transmitted by the GD to all terminals within the M2M group, and the terminals within the M2M group perform a network reentry procedure on the basis of the response.

Hereinafter, a network reentry procedure of M2M group terminals through GD will be described in detail with reference to FIG. 2 through 4.

Figure 2:
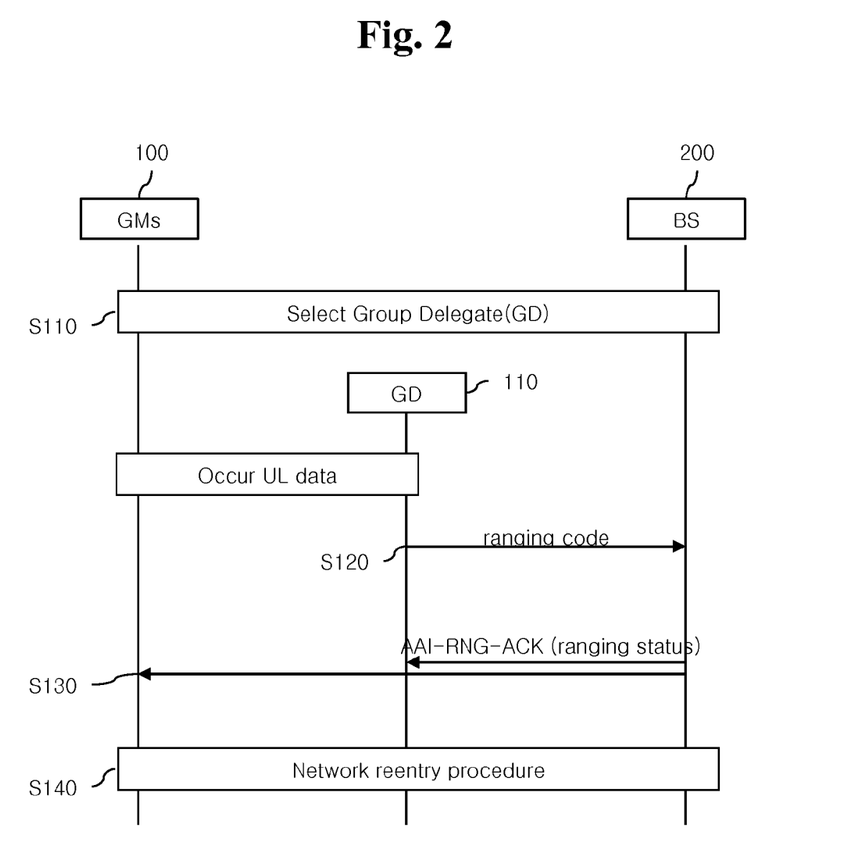
FIG. 2 is a flow chart illustrating an example of a network reentry procedure according to an embodiment of the present disclosure.

FIG. 2 is a flow chart illustrating an example of a network reentry procedure according to an embodiment of the present disclosure.

GMs 100 illustrated in FIG. 2 are M2M terminals that belong to the same M2M group, and the base station 200 can support a GD scheme.

According to an embodiment of the present disclosure which will be described below, a network reentry procedure for the M2M group may be carried out using a GD scheme.

First, one or more terminals (i.e., GMs) that belong to the same M2M group are selected as a delegate of the relevant M2M group (S110). The procedure of selecting the group delegate will be described in detail in FIG. 3. Prior to the procedure of selecting the GD, the GMs 100 may receive whether to support the GD scheme of the base station 200 from the base station 200.

The base station 200 may assign information related to the ranging for the relevant M2M group to the GD 110 selected through the procedure of S110. Here, the information required for the ranging may include a dedicated ranging code, a time offset of ranging, and the like.

Then, when there is data to be reported by terminals within the M2M group, the GD 110 transmits a ranging request (for instance, ranging code) for the M2M group to the base station 200 (S120). At this time, the ranging request may be a ranging code selected from a ranging code set based on the MGID.

The base station 200 received the ranging request transmits a response (for instance, AAI-RNG-ACK message) to the ranging request to all terminals within the M2M group (S130). Here, the response to the ranging request may include time, power, control information for the ranging code, and may further include information (for instance, frame number, subframe number, opportunity index, etc.) associated with a received time of the code, or information (for instance, window size, time offset, etc.) for the dispersion of a group paging.

Furthermore, the response to the ranging request may include a ranging status. For example, the ranging status may be "success", "abort", or "continue".

The GMs 100 received the response perform a network reentry procedure on the basis of the response (S140).

For example, If the ranging status is "success", all GMs may start a network reentry procedure. If the ranging status is "abort", all GMs may start an abort timer, and abort the ranging process until the timer expires. After the abort timer expires, this group may restart the ranging procedure based on GD. If the ranging status is "continue", the GD may adjust the relevant parameter accordingly and continue the ranging process.

During the network reentry procedure using the foregoing GD scheme, a predetermined timer (for instance, T32 timer) may be used. The timer is started if a event specific for the M2M group occurs. Each GM waits for an AAI-RNG-ACK message within a period of the timer. At this time, the AAI-RNG-ACK message is a response to the ranging code transmitted by the GD of the M2M group. If GMs receive the AAI-RNG-ACK message, then every GM initiates further action for network reentry. If GMs do not receive the AAI-RNG-ACK message, then the GMs perform voluntary network reentry upon expiry of the timer.

Figure 3:
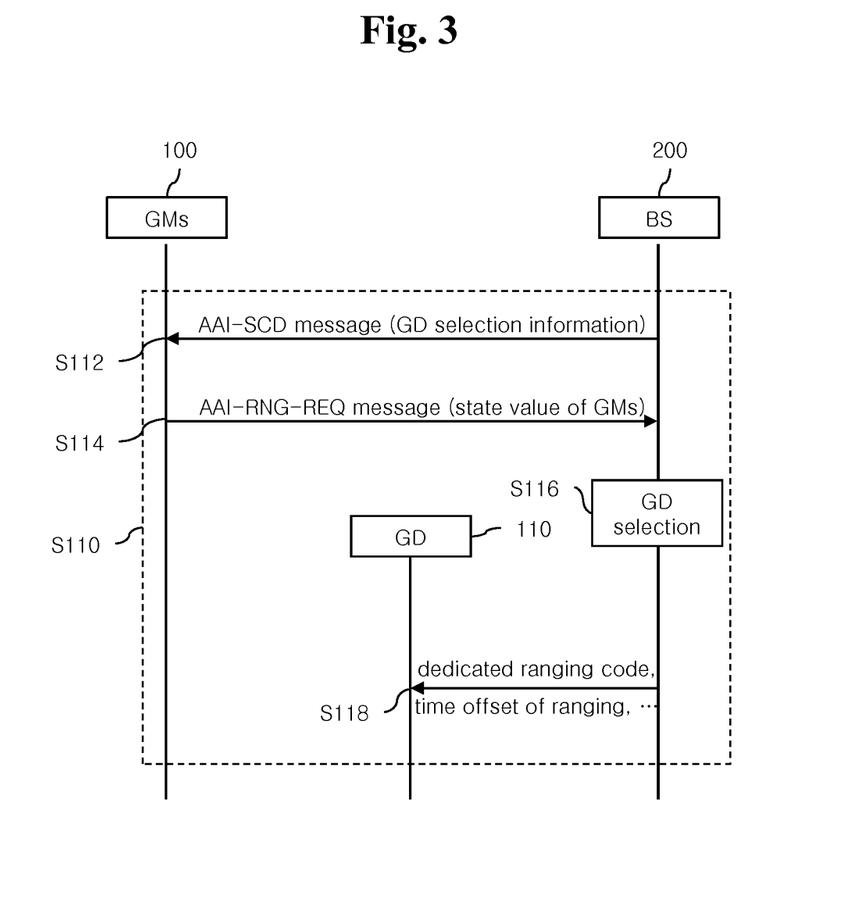
FIG. 3 is a flow chart illustrating an example of a GD selection procedure according to an embodiment of the present disclosure.

FIG. 3 is a flow chart illustrating an example of a GD selection procedure according to an embodiment of the present disclosure.

First, the GMs 100 receive information associated with the GD selection from the base station supporting a GD scheme (S112). the GMs 100 may receive the information associated with the selection of the GD from the base station through an AAI-SCD (System Configuration Descriptor) message. At this time, the information associated with the GD selection may be a GD selection criterion, a priority of the selection criterion, and a threshold value of the each selection criterion. Here, the selection criterion may be a type of supplied power (for instance, battery or wired supplied power). Otherwise, the selection criterion may be a remaining amount of battery. Otherwise, the selection criterion may be a link quality between the base station and terminal, or a geographical location of the terminal may be the selection criterion. The information associated with the GD selection may be also transferred to each GM during an initial network entry procedure.

The GMs received the information associated with the GD selection transmit their own status values associated with the relevant selection criterion to the base station 200 (S114). At this time, the information may be transmitted through AAI-RNG-REQ, AAI-SBC-REQ, and AAI-REG-REQ messages.

The base station 200 received the status value of the each GM may select GD on the basis of the received status value. For example, a terminal having the highest link quality may be selected as GD.

The base station transmits information related to the ranging for the M2M group to the GD (S118). The information required for ranging may be a dedicated ranging code, a time offset, a frequency offset, and the like. At this time, the information related to ranging may be transmitted through AAI-RNG-RSP, AAI-SBC-RSP, and AAI-REG-REQ messages, or transmitted through a newly defined MAC message.

Hereinafter, a method of allowing the GMs and base station to select GD according to another embodiment will be described.

Each GM receives information on the GD selection criterion during an initial network entry procedure. Subsequently, if the base station supports a GD scheme, then each GM transmits a randomly generated value (for instance, value p)

to the base station to determine whether to be operated as GD. The base station selects GD using the received randomly generated value. At this time, the randomly generated value may be a value generated based on the status of each GM, and the base station may enter the randomly generated value into a particular formula for selecting GD to select the GD.

In a method of allowing the GMs and base station to select GD according to another embodiment, each GM receives a specific value (for instance, value α) broadcasted from the base station. Each GM may enter the specific value into a prescribed formula and determine whether to be operated as GD based on the calculated result. In this case, the terminal determined as the GD transmits the result to the base station, and at this time, AAI-RNG-REQ, AAI-SBC-REQ, and AAI-REG-REQ messages may be used.

Figure 4:
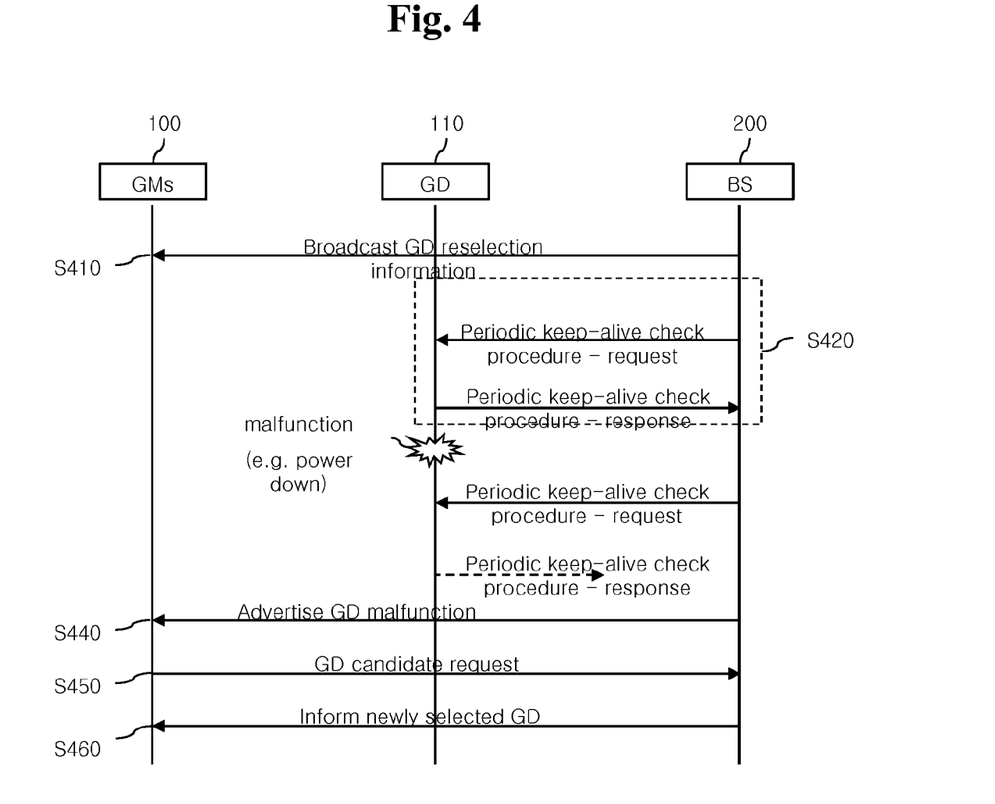
FIG. 4 is a flow chart illustrating an example of a GD reselection procedure according to an embodiment of the present disclosure.

FIG. 4 is a flow chart illustrating an example of a GD reselection procedure according to an embodiment of the present disclosure.

In a particular circumstance, it may occur a case where GD should be reselected. The examples may include a case where a previously selected GD is malfunctioned due to a hardware or software problem, a case where a link quality between the preselected GD and base station is reduced, a case where a battery level of the preselected GD is excessively reduced, and the like.

The GD reselection procedure may be started after the base station transmits a message notifying the initiation of GD reselection.

The GMs generate a random value for GD reselection based on the status of each terminal, and the above value is a seed of the GD selection. The random value may be transmitted to the base station. The transmission may be carried out during a network entry procedure, and at this time, the AAI-RNG-REQ message may be used.

The base station received the random value determines which terminal is operated as GD. The determination may be carried out based on various factors. For example, the determination may be carried out based on a location of the terminal, a specific algorithm, a link quality, a remaining amount of battery, and the like. At this time, when the GD is determined using an algorithm, a random value transmitted by the terminal may be the seed. The base station may notify the result of the GD selection to GMs, and at this time, an AAI-RNG-RSP message may be used.

There may exist a priority among the GD reselection criteria. If a remaining amount of battery is important, then each GM may periodically report its own battery level. Such a reporting period and procedure should be defined in advance.

If a link quality is important, then the base station may check a recent communication history to determine the GD. In this case, an additional operation of the terminal may be omitted.

If a location of the terminal is important, then the base station may determine the GD based on the location history of each terminal that has been previously stored in the base station.

When a specific terminal has priority to perform a GD operation, the base station may select another GD dedicated terminal Otherwise, the network operator may predetermine the next priority GD, and in this case, notification message transmission may be required.

When GD reselection is determined by the terminal, only the terminal satisfying a threshold value of each GD selection criterion may transmit a GD candidate request to the base station.

FIG. 4 illustrates an example of the foregoing GD reselection procedure.

The base station 200 transmits a message containing information associated with GD reselection to all GMs 100 (S410). The message may include a (re)selection criterion, a priority, and the like. At this time, the message may be an AAI-SCD message.

The base station 200 may periodically transmit and/or receive a signal to and/or from the previously selected GD 110 to check the operation status of the GD (S420).

When a problem such as malfunction or the like occurs in the GD to generate an error in the periodic check, the base station 200 transmits a message indicating GD reselection (S440). The GMs 100 received the message transmit their own status values associated with a GD reselection criterion (S450). At this time, only the terminal that can be operated as GD may perform the transmission.

The base station 200 received the status value from the GMs 100 may determine a new GD. At this time, priority with the GD (re)selection criterion may be applicable. If the GD is determined, the base station 200 may notify a newly selected GD to GMs (S460).

Figure 5:
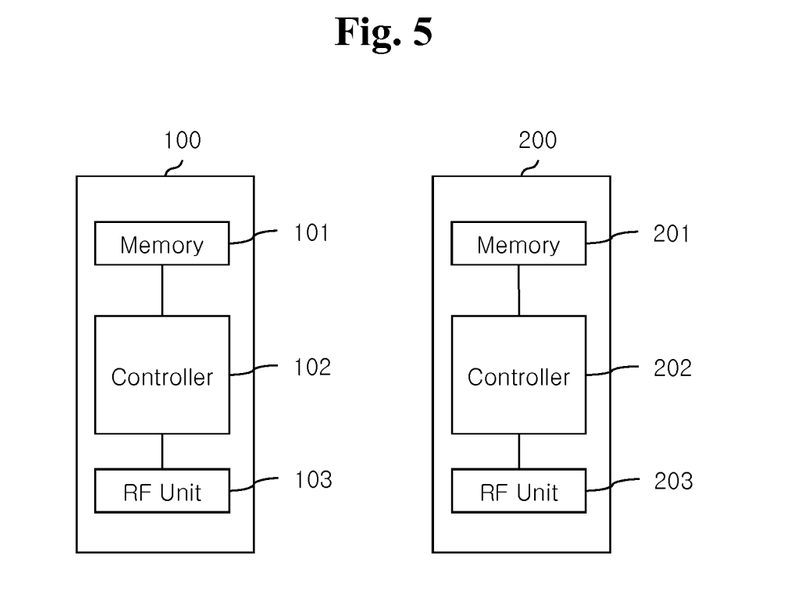
FIG. 5 is a configuration block diagram illustrating an M2M terminal and a base station according to embodiments of the present disclosure.

FIG. 5 is a configuration block diagram illustrating an M2M terminal and a base station according to embodiments of the present disclosure.

As illustrated in FIG. 5, an M2M terminal (device) 100 may include a memory 101, a controller 102 and a transceiver 103, and the base station 200 may include a memory 201, a controller 202 and a transceiver 203.

The memory 101, 201 stores the methods illustrated in FIGS. 2 through 4, respectively, and the controller 102, 202 implements the above methods stored in the memory 101, 201 to control the memory 101, 201 and the transceiver 103, 203.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in a form that is not combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments. In addition, it will be apparent that an embodiment may be configured by a combination of claims cited by each other and a new claim may be included by the amendment after filing the application.

The present invention may be embodied in other specific forms without departing from the concept and essential characteristics thereof. The detailed description is, therefore, not to be construed as illustrative in all respects but considered as restrictive. The scope of the invention should be determined by reasonable interpretation of the appended claims and all changes that come within the equivalent scope of the invention are included in the scope of the invention. In addition, it will be apparent that an embodiment may be configured by a combination of claims cited by each other and a new claim may be included by the amendment after filing the application.

The invention claimed is:

1. A method for M2M devices in an idle mode to perform a network reentry procedure in a wireless access network supporting machine-to-machine communication (M2M), the method comprising:

receiving information related to selection of a group delegate (GD) from a base station;
receiving a response to a ranging request from the base station,
wherein the ranging request is transmitted by an M2M device which is selected as the GD among a plurality of M2M devices in an M2M device group based on the information related to selection of the GD; and
performing a network reentry procedure on the basis of the received response.

2. The method of claim 1,
wherein the M2M device is selected as the GD by the base station on the basis of a status value of each of the M2M devices,
wherein the status value of each of the M2M devices corresponds to the information related to the selection of the GD, and is transmitted by each of the M2M devices; and
wherein the M2M device receives ranging information for the M2M device group.

3. The method of claim 1, wherein the information related to the selection of the group delegate (GD) is received through an AAI-SCD message.

4. The method of claim 1, wherein the information related to the selection of the group delegate (GD) comprises:
at least one of a GD selection criterion, a priority of the selection criterion, and a threshold value of the each selection criterion,
wherein the selection criterion comprises at least one of a type of power supply, a remaining amount of battery, a link quality, and a location of the terminal.

5. The method of claim 2, wherein said status value of each of the M2M devices is transmitted through an AAI-RNG-REQ message, an AAI-SBC-REQ message or an AAI-REG-REQ message.

6. The method of claim 2, wherein said M2M device, which is selected as the GD, receives the ranging information for the M2M device group through an AAI-RNG-RSP message, an AAI-SBC-RSP message or an AAI-REG-RSP message.

7. The method of claim 1,
wherein the M2M device determines to perform a GD function on the basis of the received information related to the selection of the GD; and
wherein the M2M device transmits the determined result value to the base station, and receives ranging information for the M2M device group.

8. The method of claim 1, wherein the ranging request transmitted by the M2M device which is selected as the GD is a ranging code assigned by the base station.

9. The method of claim 1, wherein the response to the ranging request is transmitted through an AAI-RNG-ACK message.

10. The method of claim 9, wherein the response to the ranging request comprises one ranging state of success, abort, and continue.

11. The method of claim 1, further comprises:
starting a timer upon a detection of an event of specific for the M2M device group; and
wherein the network reentry procedure is performed on the basis of the response in case of receiving the response to the ranging request before the timer expires.

12. A device in a wireless access network supporting machine-to-machine communication (M2M), the device comprising:
a transceiver configured to transmit and/or receive a radio signal to and/or from the outside; and
a controller connected to the transceiver and configured:
to receive information related to selection of a group delegate (GD) from a base station,
to receive a response to a ranging request from base station, wherein the ranging request is transmitted by an M2M device which is selected as the GD among a plurality of M2M devices in an M2M device group based on the information related to selection of the GD, and
to perform a network reentry procedure on the basis of the received response to the ranging request.

13. The device of claim 12, wherein the controller controls the transceiver to transmit a status value of the device corresponding to the received information related to the selection of the group delegate (GD) to the base station.

14. The device of claim 13, wherein the information related to the selection of the group delegate (GD) is transmitted through an AAI-SCD message.

15. The device of claim 12, wherein the controller determines whether to perform a GD function on the basis of the received information, and controls the transceiver to transmit the determined result value to the base station.

16. The device of claim 12, wherein the ranging request transmitted by the M2M device which is selected as the GD is a ranging code assigned by the base station.

17. The device of claim 12, wherein the response to the ranging request is transmitted through an AAI-RNG-ACK message.

* * * * *